United States Patent [19]

Shepherd

[11] Patent Number: 5,398,248
[45] Date of Patent: Mar. 14, 1995

[54] RESOLVING CONFLICTS BETWEEN COMMUNICATION SYSTEMS

[75] Inventor: Robert Shepherd, Canterbury, England

[73] Assignee: U.S. Philips Corporation, New York, N.Y.

[21] Appl. No.: 87,620

[22] Filed: Jul. 1, 1993

[30] Foreign Application Priority Data

Jul. 2, 1992 [GB] United Kingdom ............. 9214066

[51] Int. Cl.⁶ .......................................... H04J 3/16
[52] U.S. Cl. .............................. 370/95.2; 370/85.4; 370/85.8; 455/33.4
[58] Field of Search ............. 370/95.2, 85.4, 85.3, 370/85.8, 85.5, 85.15, 94.1, 60, 60.1, 85.13; 455/33.4, 53, 54

[56] References Cited

U.S. PATENT DOCUMENTS

| | | | |
|---|---|---|---|
| 4,716,408 | 12/1987 | O'Connor et al. | 340/825.5 |
| 4,780,871 | 10/1988 | Arakawa | 370/85.4 |
| 4,949,337 | 8/1990 | Aggers et al. | 370/85.4 |
| 4,988,990 | 1/1991 | Warrior | 340/825.5 |
| 5,012,468 | 4/1991 | Siegel et al. | 370/85.5 |
| 5,018,139 | 5/1991 | Despres | 370/94.3 |
| 5,103,448 | 4/1992 | Barnes et al. | 370/95.2 |
| 5,122,794 | 6/1992 | Warrior | 340/825.20 |
| 5,166,678 | 11/1992 | Warrior | 340/870.15 |

FOREIGN PATENT DOCUMENTS

| | | |
|---|---|---|
| 0222308 | 5/1987 | European Pat. Off. |
| 2069799 | 8/1981 | United Kingdom |

Primary Examiner—Douglas W. Olms
Assistant Examiner—Shick Hom
Attorney, Agent, or Firm—Leroy Eason

[57] ABSTRACT

First and second independent communication systems are linked across an intersystem interface by a virtual circuit constituted by a land line linking the central stations of both systems. Occasionally both central stations may attempt to simultaneously use the virtual circuit, which cannot be done for digitized speech because in that case the virtual circuit operates as a simplex link. A method of resolving this conflict is disclosed, whereby one of the central stations is issued a token by the other entitling the holder of the token to use the virtual circuit. After the transaction is completed, the token is then returned. Two algorithms are disclosed, one based on the last user of a token giving it to the other user, and the other of which takes into account the number of registered secondary stations in each system.

7 Claims, 4 Drawing Sheets

RESOLVING CONFLICTS BETWEEN COMMUNICATION SYSTEMS

BACKGROUND OF THE INVENTION

1. Field of the Invention

The present invention relates to resolving conflicts when making point to multipoint calls involving first and second communication systems of equal status and which are linked by way of a virtual circuit has particular, but not exclusive, application to resolving conflicts in digital trunked private mobile radio systems.

2. Description of the Related Art

Insofar as avoiding conflicts with respect to access of both analog and digital trunked private mobile radio systems is concerned, a well known technique is dynamic framelength slotted Aloha as described and claimed for example in British Patent Specification 2 069 799B (PHN 9693). A source of conflicts which cannot be resolved by such an access protocol, however, is when two digital trunked private mobile radio systems have to communicate with each other by way of a virtual circuit across an intersystem interface and each system wants to use the virtual circuit at the same time. An example of such an arrangement is two regional police forces A and B, each having a central communication station, including a system controller and base station transceivers, and a plurality of secondary stations (mobile and portable radio units) which communicate with the central station, the respective central stations being interconnected by a virtual circuit formed by landline which constitutes the intersystem interface. Such a conflict may occur in a vehicle pursuit situation where a car from police force A crosses the regional interface into police force B's area. Whilst the pursuit was within region A communication between the pursuit vehicle, the central station and other secondary stations is controlled by the system controller at the central station in region A. Thus the system controller avoids conflicts by assigning physical channels according to predetermined procedures. However, in the event of a car from police force A entering police force B's radio coverage area, force B's central station has to provide a channel for communication between police force A's secondary station and force A's central station by means of a radio channel from force A's secondary station and force B's central station to a link between the two central stations. Additional resources may also be allocated to facilitate communication between the two central stations and with force B's secondary stations. It can occur that, within the operational parameters of each system, substantially coincident transmissions are attempted via each central station to the other central station. If the respective transmissions are of equal priority then a conflict situation arises and since there is no central arbiter, a method of resolving this conflict is desirable as an alternative to each central station instructing its secondary station to retry at a random interval later which is less efficient.

SUMMARY OF THE INVENTION

According to a first aspect of the present invention there is provided a method of resolving conflicts between first and second communication systems of equal status which are linked by way of a virtual circuit. The system wishing to make a call by way of the virtual circuit transmits a token request to the other system, which checks to see if it has a request generated locally therein to use the virtual circuit, and if not, it grants the token request.

According to a second aspect of the present invention there is provided a combination of first and second communication systems, each system including a central station which communicates by radio with secondary stations registered with the central station, and a virtual circuit interconnecting the central stations of the first and second systems. Each central station has means for communicating with the other by way of the virtual circuit, and means for responding to a request from the other central station for granting a token permitting the other central station to use the virtual circuit.

By using a method whereby a receiving central station grants a token entitling a transmitting central station to use the virtual circuit, a potential conflict can be resolved effectively without the need for a central arbitration stage.

In the event of a conflict occurring when both central stations wish to use the virtual link simultaneously this may be resolved by the system which last used the virtual circuit granting a token to the other system. Thus a conflict is resolved in a simple, even handed manner.

Such a method, however, does not take into account the respective size of each system as determined by the number of secondary stations currently registered with a central station. If there is a large difference between the sizes of the first and second systems, this may be taken into account when each central station decides whether or not it should grant a token to the other central station when a conflict occurs.

BRIEF DESCRIPTION OF THE DRAWINGS

The present invention will now be described, by way of example, with reference to the accompanying drawings, wherein.

DESCRIPTION OF THE PREFERRED EMBODIMENTS

Figure 1:
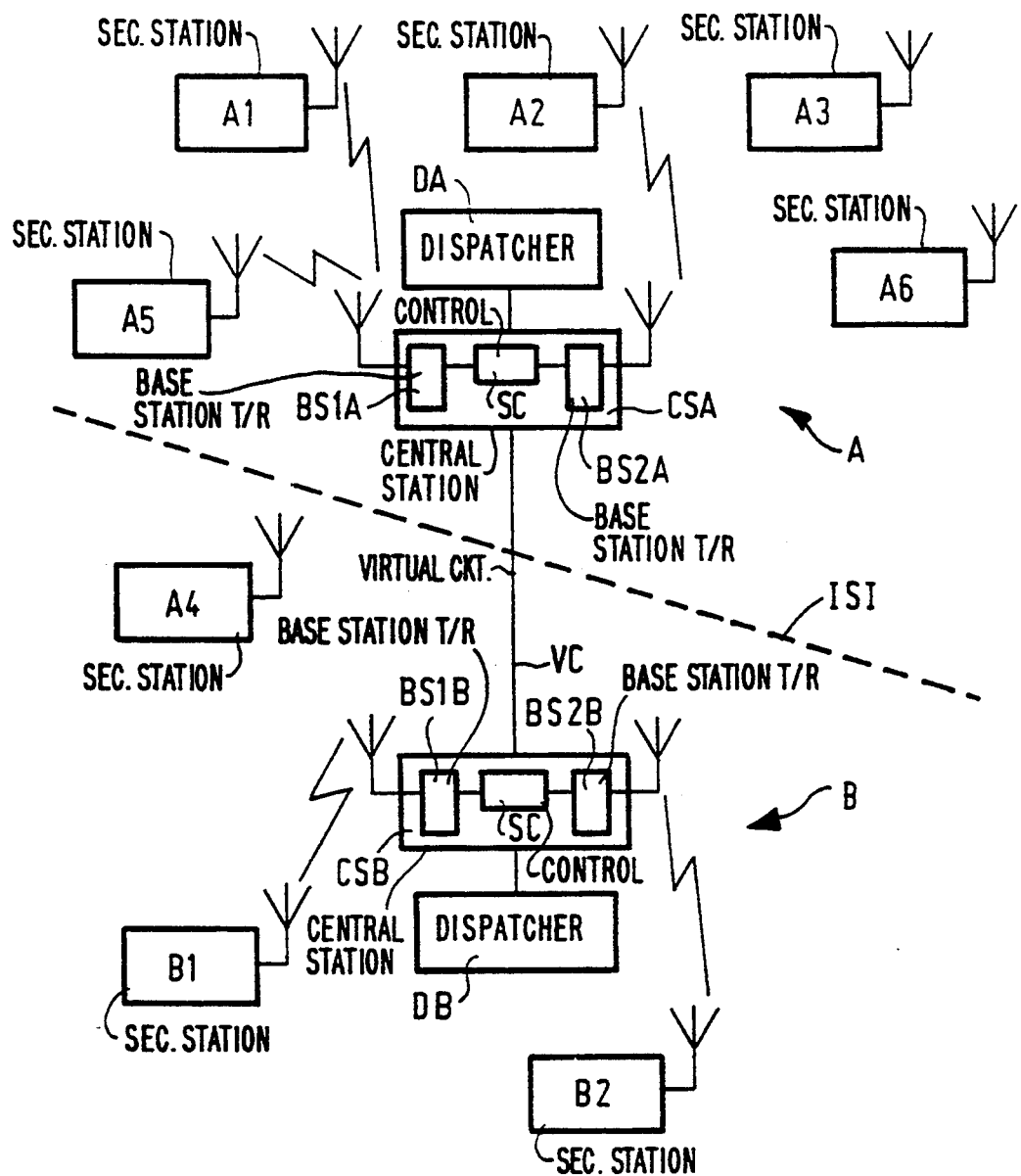
FIG. 1 is a block schematic diagram of two digital trunked mobile radio systems having central stations linked by a virtual circuit.

Referring to FIG. 1, two digital trunked private mobile radio systems A and B operate within their own radio coverage areas, the boundary between these coverage areas being termed the intersystem interface ISI. Each system A,B comprises a central station CSA,CSB comprising a system controller SC and base station transceivers BS1A,BS2A and BS1B,BS2B, respectively, a dispatcher DA,DB connected to its respective central station CSA,CSB and a plurality of secondary stations A1 to A6 and B1,B2 comprising mobile or portable radio units, at least some of which are able to roam relative to their respective central stations CSA,CSB into and out of their radio coverage areas. A land line or virtual circuit VC interconnects the central stations CSA,CSB.

Communication between each central station and its secondary stations may be by TDMA or FDMA. Any suitable access protocol may be used by which the secondary units can gain access to the system, for example dynamic framelength slotted Aloha.

In a group call situation a single radio user, say secondary station A1, wants to be able to communicate simultaneously with members of a group comprising say the central station CSA and secondary stations A2 and A5. This is referred to as a point to multipoint call.

Trunked private mobile radio systems are in general semi-duplex, because although they use different frequencies for transmit and receive, the actual speech communication can only be in one direction at any given time. Where two radio users, say two mobile secondary stations try to transmit at the same time on the same radio channel there is conflict (which may also be known as contention). With a trunked private mobile radio system employing a central station, the actual transmitting by a secondary station can be controlled by the instigation of a signalling system which requires the secondary station to request permission to transmit from the system controller in the central station. The resolution of conflict of truly simultaneous requests to transmit is dealt with by, for example, dynamic framelength slotted Aloha techniques.

In analogue trunked private mobile radio systems if more than one radio channel is available then the received signals can be received on the different channels and mixed to form a composite audio signal. This case is also true where the received signals are spatially separated such that they do not interfere and would in this case be received by different base stations. The spatial separation may spread over more than one trunked radio system, the central stations of which are connected nominally by a land line. As long as the connection is duplex and a mixing technique is employed there is no conflict for the resource across the intersystem interface. Such a technique provides a multipoint to multipoint call.

In a digital trunked private mobile radio system in which low bit rate speech encoders are utilised, the nature of the speech codec, which synthesises the human vocal tract, means that it cannot deal satisfactorily with multiple voices. Thus the concept of group call has to be restricted to being point to multipoint calls only. Although the conflict resolution for resources on one system is handled quite adequately by the transmit request technique described above, a problem arises when there is a group call to be distributed across two systems A,B, each with its own central station CSA,CSB of equal status, as neither central station has an automatic right to assign transmit permission or otherwise on the other system. Because the group call is restricted to being point to multipoint only by virtue of the speech codec, only one call at a time may be accepted across the intersystem interface (ISI). Thus it is irrelevant whether the ISI is physically a duplex link, a semi-duplex or a simplex link, it has to be regarded simplistically as being only a simplex link. Accordingly, conflict or contention occurs when both central stations CSA,CSB simultaneously have calls requiring use of the virtual circuit VC.

In accordance with the present invention this conflict is resolved by one central station, say CSB, giving, on request, the other central station, say CSA, a token which gives that central station (CSA) the right to use the virtual circuit. More particularly, assembled that secondary station A5 wishes to set up a call from system A to system B by way of the virtual circuit VC. Secondary station A5 initially gains access to its oven central station CSA, which in turn contacts the central station CSB by way of the virtual circuit VC and requests a token to use the traffic channel of the virtual circuit VC. Assuming that the required resources are available, the central station CSB grants the token to the central station CSA and the call from the secondary station A5 proceeds. When the transmission from this secondary station ceases, the central station CSA contacts the central station CSB and returns the token.

Figure 2:
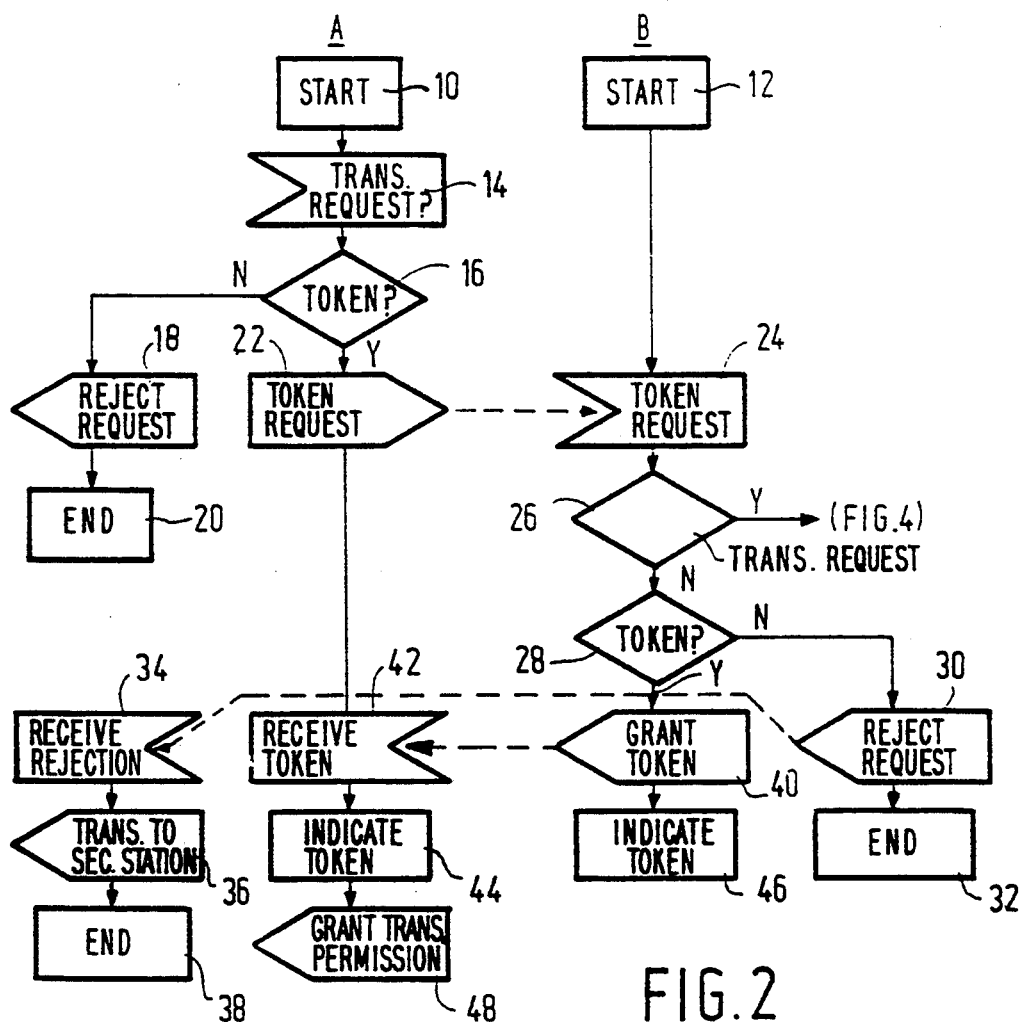
FIG. 2 is a flow chart of a first central station issuing a token to a second central station, without there being any contention for the virtual circuit.
Figure 3:
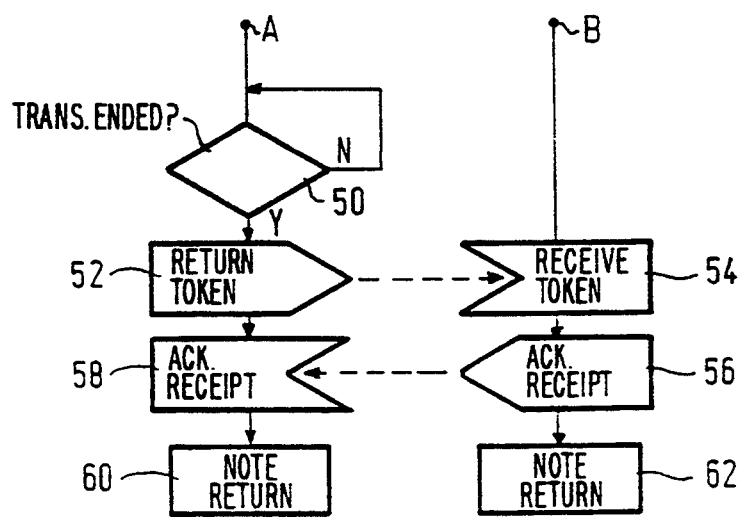
FIG. 3 is a flow chart relating to the return of a token at the end of a call.

The issuing and returning of tokens where no contention occurs is illustrated by the flow charts of FIGS. 2 and 3, respectively.

Referring to FIG. 2, blocks 10,12 indicate the starting of systems A and B. Block 14 denotes the receiving of a transmission request by the central station CSA from one of its secondary stations to make a call via the virtual circuit VC. Block 16 indicates the question "Is there a token in?". If there is not (N), the central station CSA rejects the transmission request, block 18, and the process is ended, block 20.

If the answer to the question in block 16 is "Yes"(Y), then the central station CSA sends a token request, block 22, which is received by the central station CSB, block 24. The central station CSB checks to see if it has any requests for transmission from secondary stations registered with it, block 26. If it has none (N), it then checks to see if the token is in, block 28. If it is not (N), then the token request is rejected, block 30, after which the process is ended on system B, block 32. Block 34 indicates the receiving of the rejection of the token request by the central station CSA. This rejection is transmitted by the central station CSA to its secondary station, block 36, and thereafter the process is terminated, block 38.

If the answer to the question in block 28 is "Yes"(Y), then the central station CSB grants the token, block 40, which is received by the central station CSA, block 42. Both central stations store an indication that the token has been granted, blocks 44,46, and the central station CSA transmits the grant of the transmission permission requested to its secondary station, block 48.

FIG. 3 relates to the return of the token by the central station CSA. Block 50 indicates the question "Has the transmission ended?". If the transmission is still in progress (N), the question is repeated subsequently. If the transmission has ended (Y), the central station CSA returns the token to the central station CSB, block 52, which is received by system B, block 54. the central station CSA transmits an acknowledgement of receipt of the token, block 56, which is received by the central station CSB, block 58. Both central stations note that the token has been returned, blocks 60,6.

If now, say secondary stations A2 and B1 transmit substantially simultaneous requests to their respective central stations CSA,CSB, which requests both require the use of the virtual circuit VC, then when both central stations substantially simultaneously request the other to grant a token in accordance with the procedure shown in FIG. 2, conflict occurs which requires resolution.

One method of resolving conflict is to issue the token to the system which did not have it last. This method is illustrated in the flow chart shown in FIG. 4.

Blocks 10,12 indicate the starting of the systems A,B. Blocks 64,65 denote the respective central station CSA,CSB receiving a transmission request from one of the secondary stations registered on their system. Each central station checks to see if the token is in, blocks 66,67. If it is not (N), the transmission request is rejected, blocks 68,69, and the transaction is ended, blocks 70,71.

If each central station has a token in (Y), it sends a token request to the other central station, blocks 72,73, which request is received, blocks 74,75. A check is made to see if the respective central station has received any local requests, blocks 76,77 (which are equivalent to block 26 in FIG. 2). If the answer is No(N) then the flow chart in FIG. 2 is followed. However if the answer is Yes(Y), then a check is made as to which central station was granted the last token, blocks 78,79. In this example it will be assumed that system A received the last grant. The answer to block 78 is yes(Y) and to block 79 is No(N). Accordingly the central station CSA grants the token to system B, block 80, whilst the central station CSB rejects system A's request for a token, block 81. The receipt of the rejection and the grant is received by each system, blocks 82,83.

Figure 4:
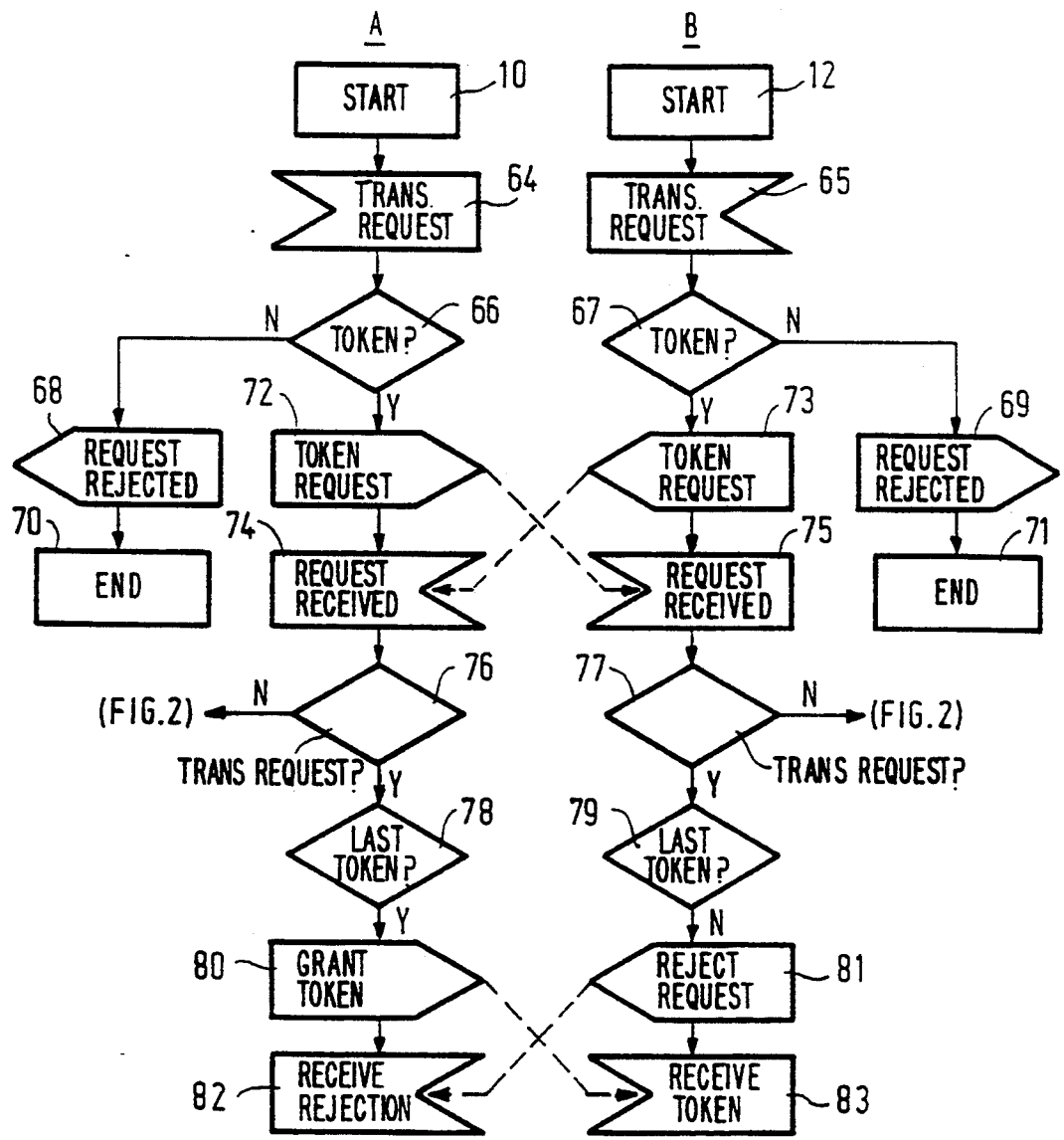
FIG. 4 is a flow chart of a first method of resolving contention for access to the virtual circuit.

The flow chart of FIG. 4 assumes a substantially even handed issuing of grants by each station. However this even handed approach may be unfair if one system has a significantly larger number of secondary stations than the other system, for example in the ratios of 2:1 or 3:1.

Figure 5:
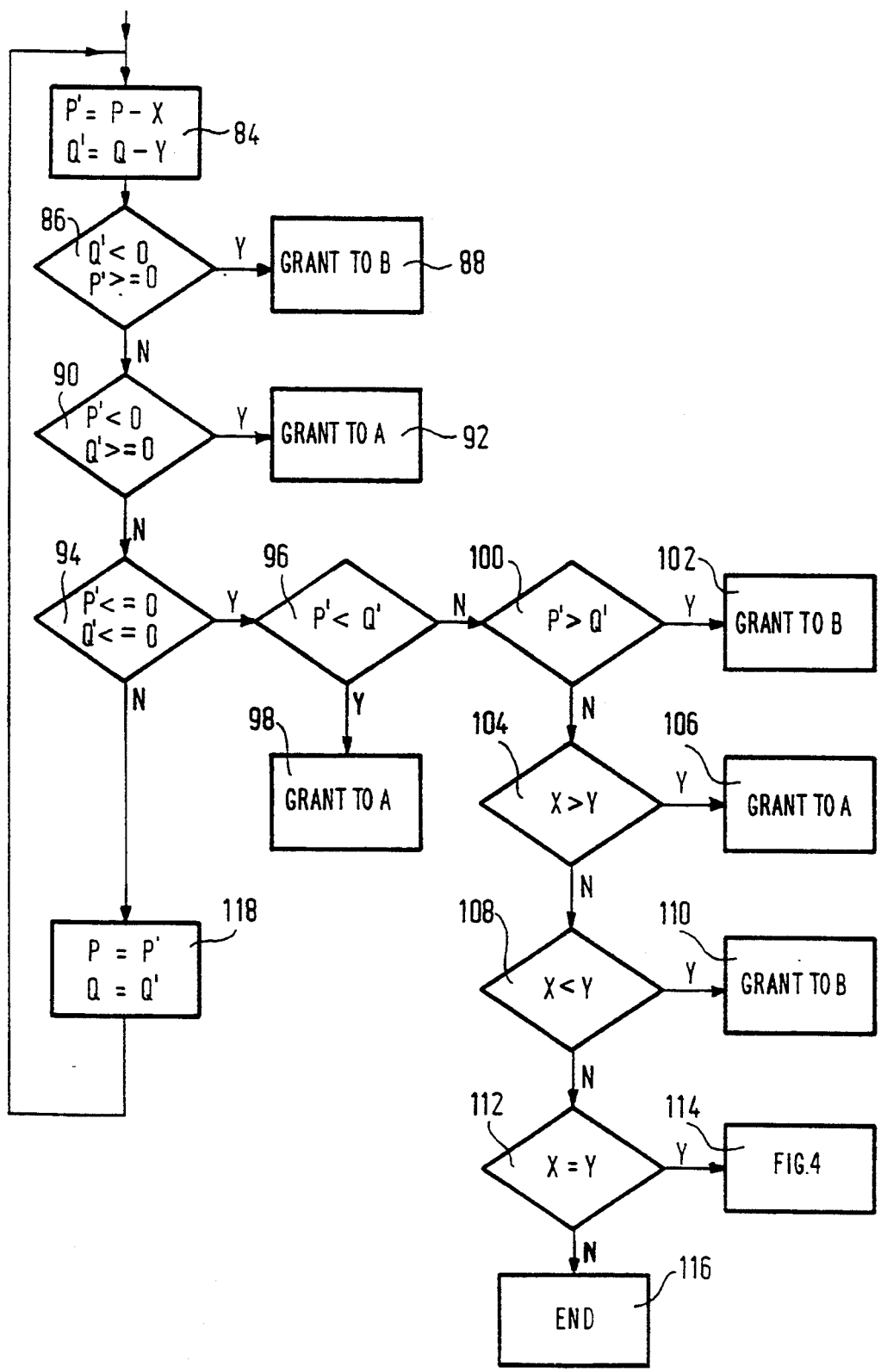
FIG. 5 is a flow charge of a second method of resolving contention for access to the virtual circuit.

Accordingly a second method of resolving conflicts which takes this inequality in the number of secondary stations into account makes use of an algorithm which reflects on the number of secondary stations, including visiting stations, currently registered on each system. FIG. 5 is a flow chart of the algorithm but before referring to it some background information will be given.

Let the number of secondary stations currently registered on systems A and B be X and Y respectively, where the total numbered registered is $Z(=X+Y)$.

During normal transmissions, system A has been granted the token P times and system B has been granted the token Q times. Referring now to FIG. 5, the algorithm commences at block 84 by calculating P' and Q' where $P'=P-X$ and $Q'=Q-Y$, block 84. In block 86 the question is asked "Is $Q'<0$ and $P'>=0$?". If the answer is Yes(Y), system A grants the token to system B, block 88. Alternatively if the answer is No(N), then in block 90 the question is asked "Is $P'<0$ and $Q'>=0$?". If the answer is Yes(Y) system B grants the token to system A, block 92. If the answer is No(N) then in block 94 the question is asked "Is $P'<=0$ and $Q'<=0$?". If the answer is No(N) the flow chart moves to block 118 where P is set equal to P' and Q is set equal to Q' after which the algorithm is restarted at block 84. If the answer to block 94 is Yes(Y) then a check is made to see if $P'<Q'$, block 96. If it is Yes(Y), then system B grants the token to system A, block 98. If it is No(N) then a check is made to see if $P'>Q'$, block 100. If it is Yes(Y), then system A grants the token to system B, block 102. If it is No(N) then a check is made on the number of secondary stations registered in each system by first checking to see if $X>Y$, block 104, if the answer is Yes(Y) then the system B grants the token to the system A, block 106. If the answer is No(N) then a check is made to see if $X<Y$, block 108. If the answer is Yes(Y) then the system A grants the token to the system B, block 110, but if the answer is No(N), then a check is made to see if $X=Y$, block 112. If it is, Yes(Y), then the last grant procedure (blocks 78 to 83 of FIG. 4) is followed, block 114. Block 116 denotes the termination of the algorithm.

From reading the present disclosure, other modifications will be apparent to persons skilled in the art. Such modifications may involve other features which are already known in the design, manufacture and use of communication systems and component parts thereof and which may be used instead of or in addition to features already described herein.

I claim:

1. A method of resolving conflicts between two communication systems of equal status and which are linked by a virtual circuit providing at least a simplex communication path; each of said systems comprising a central station and at least one secondary station having transceiving means, the central station including a system controller and base station transceiving means, said method comprising the steps of:
    (i) transmission by the central station of a first of said systems of a token request to a second of said systems by way of the virtual circuit, for authorization to set up a calling path by way of the virtual circuit between the first system and the second system;
    (ii) checking by the system controller of the second system to determine if there is a request from a secondary station in the second system to make a call by way of the virtual circuit;
    (iii) granting of said token request by the system controller of the second system if the determination made in step (ii) is in the negative; and
    (iv) in response to the granting of said token request, setting up by the central station of the first system of a point to multi-point calling path from the first system to the second system by way of the virtual circuit.

2. A method as claimed in claim 1, wherein in the event that the central stations of both systems transmit token requests to each other substantially simultaneously, said method further comprises granting the token request of the system other than the one from which a call was last transmitted by way of the virtual circuit.

3. A method as claimed in claim 1, wherein in the event that the central stations of both systems transmit token requests to each other substantially simultaneously, said method further comprises deciding which request to grant by taking into account the relative numbers of secondary stations which are registered in each of said systems and from which system a token request was last granted.

4. A method as claimed in claim 3, further comprising maintaining, by the system controller in each system, of lists of home secondary stations and visiting secondary stations which are registered with the relevant system.

5. A combination comprising:
    two communication systems of equal status, each comprising a central station and at least one secondary station having transceiving means, the central station including a system controller and base station transceiving means;
    a virtual circuit interconnecting the central stations of the two systems and providing at least a simplex communication link there-between;
    the central stations of the two systems being adapted to transmit token requests to each other by way of said virtual circuit and said base station transceiving means, a token request being a request for the granting of a token to authorize use the virtual circuit;

the system controller of each central station being adapted, in response to reception of a token request, to check whether a secondary station in its own local system has issued a transmission request requiring use the virtual circuit, and if not, to grant the received token request; and the system controller of each central station being further adapted, upon the granting of its token request, to cause said central station to set up a point-to-multi-point calling path to the opposite one of said systems by way of said virtual circuit.

6. A combination as claimed in claim 5, wherein the system controller of each central station is adapted to (i) record whether it granted a token request last received thereby, and (ii) in the event that a token request is currently received substantially simultaneously with the sending its own token request, to grant the currently received token request if the last previously received token request was denied, and to deny the currently received token request if the last previously received token request was granted.

7. A combination as claimed in claim 6, wherein the system controller of each central station is adapted to take into account the relative numbers of secondary stations registered in its system and in the other of said systems in deciding whether or not to grant a received token request.

* * * * *